United States Patent Office 2,858,977
Patented Nov. 4, 1958

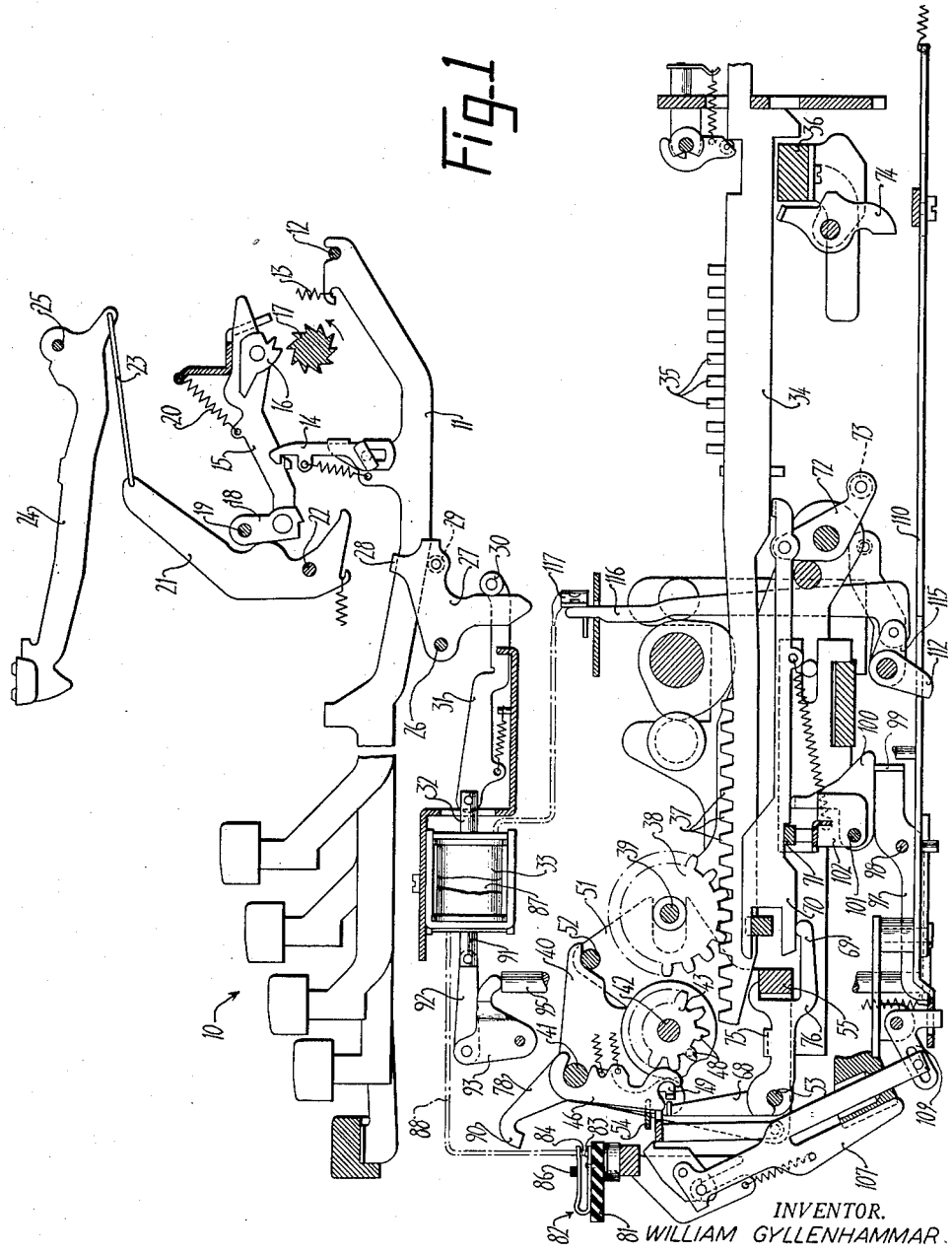

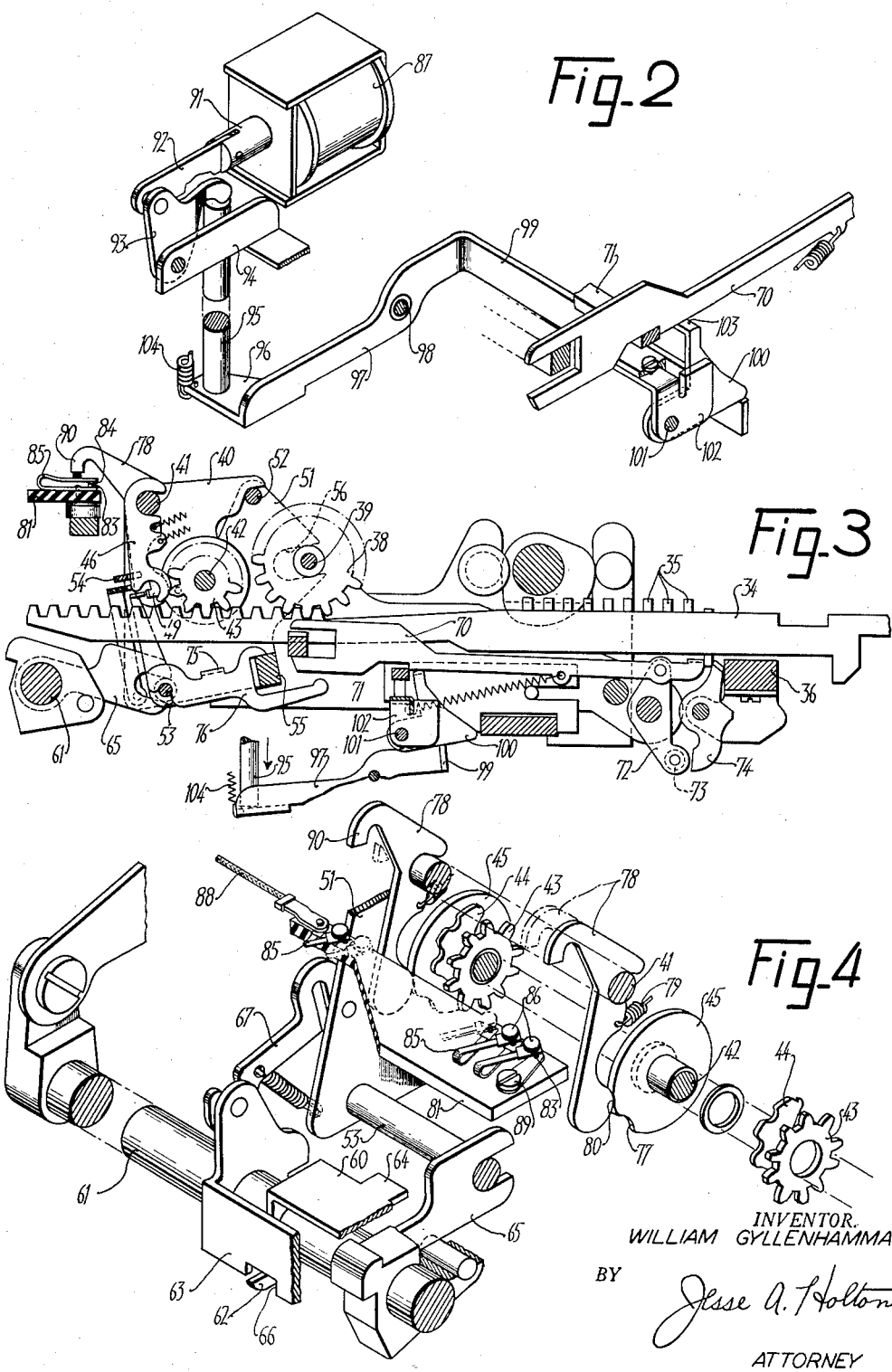

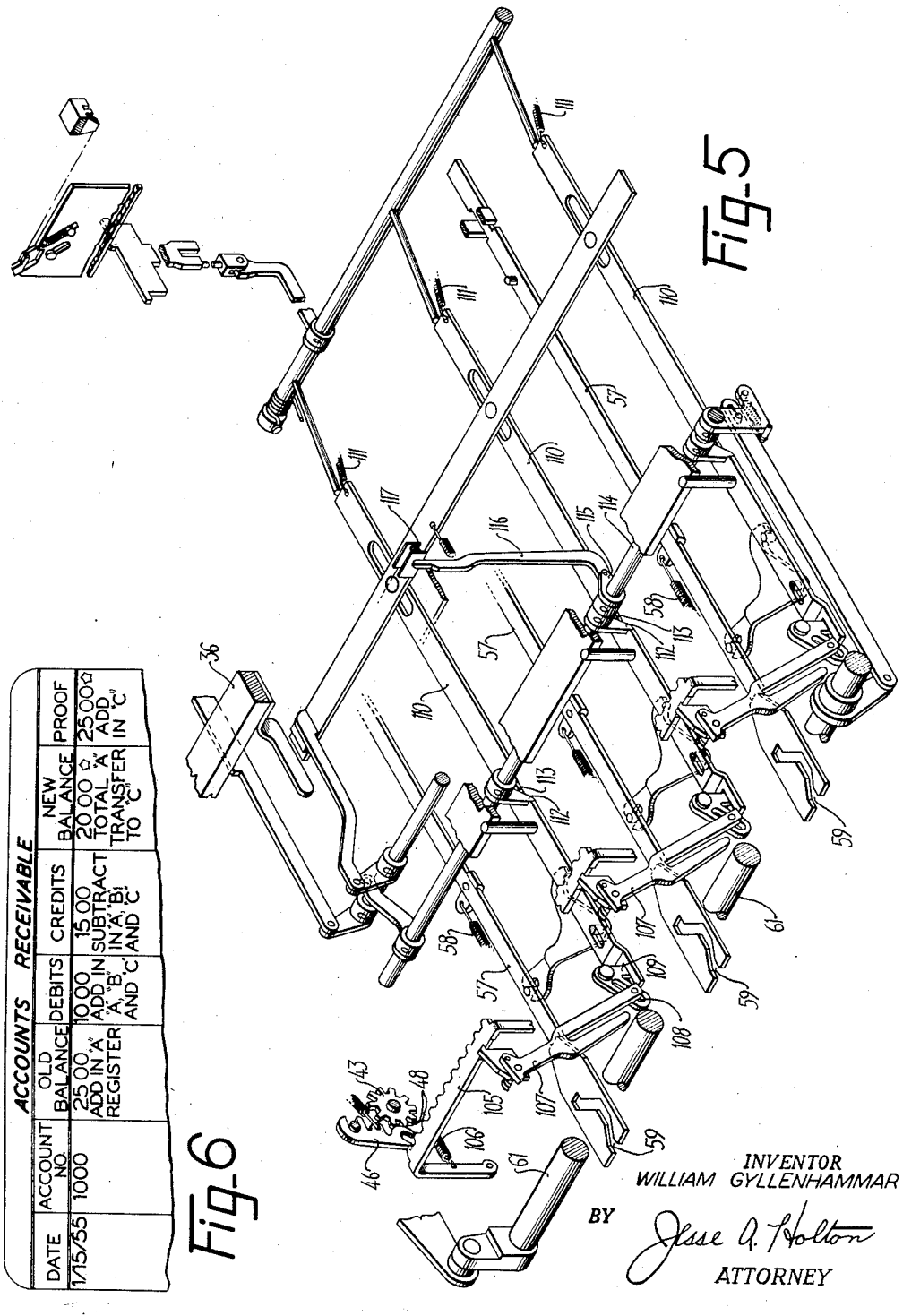

2,858,977

NINES COMPLEMENT TRUE NEGATIVE TOTAL REGISTER WITH CLEAR SYMBOL PRINTING

William Gyllenhammar, Stepney, Conn., assignor to Underwood Corporation, New York, N. Y., a corporation of Delaware Application June 1, 1955, Serial No. 512,375

5 Claims. (Cl. 235—60.17)

This invention relates to multiple register accounting machines of the type provided with "elusive" or "fugitive one" mechanism and to means for automatically printing a distinctive symbol when a register is "cleared," irrespective of whether the clearing results from an adding or a subtracting operation.

As is thoroughly understood by those familiar with the art of accounting machines, when a register overdrafts, that is, contains a negative amount, as when a larger number is subtracted from a smaller number, the register wheels stand at the complement of the true negative amount. For example, in a five wheel register, the wheels will stand at 99900 when representing minus 100. Thus, in reading a complementary amount, the lowest order significant digit other than "0" is the "tens" complement of the true negative amount, all "0's" to the right thereof are "0's" and all digits to the left thereof are the "nines" complement of the true negative amount, and when the wheels are to be mechanically "sensed" and the amount automatically printed, some provision must be made for taking this fact into account.

The automatic printing of a negative total may be greatly facilitated by conditioning the register wheels so that they will all stand at the "nines" complement and this may be accomplished by substracting "one" from the register. Thus, in the example given above, if "one" is subtracted from the register standing at 99900, the wheels will register 99899. This taking away of "one" may be automatically brought about by means of what is known as "fugitive one" mechanism. With all the wheels registering the "nines" complement, it becomes comparatively simple to "sense" the wheels and print the true negative amount.

If 100 is added into a register containing a minus 100 represented by 99899, the wheels will turn to 99999, but this is actually a "clear" condition, since the "nines" complement is zero. Of course, when a positive amount in the register is subtracted out, the wheels turn to 00000. This briefly described operation of the register wheels is well-known to those skilled in the accounting machine art and will become more readily apparent to others as this specification proceeds.

In certain accounting procedures, as will be hereinafter particularly referred to, it is desired for the machine to automatically print a distinctive symbol when a manually entered amount results in the clearing of the register, regardless of whether the amount is entered additively or subtractively. Machines of the type with which this invention is concerned are customarily provided with means for "sensing" the all "0" condition of the register and for printing a "clear" symbol when such condition occurs. Frequently however, there is no provision for printing a "clear" symbol when all the wheels stand at "9's," or if there is such provision it is apt to be highly complex or unreliable in operation, as for example, a "clear" sign may be printed when some of the wheels stand at "9" and others at "0."

It is the primary object of the present invention to provide an accounting machine having "fugitive one" mechanism with improved means for automatically printing a "clear" symbol when a register is "cleared" as the result of a manually entered amount, irrespective of whether the amount is entered additively or subtractively.

It is a further object of the invention to provide an accounting machine having "fugitive one" mechanism with means for turning the wheels of a register to "0's" whenever the register is "cleared," whether the clearing results from an adding operation or a subtracting operation.

These and further objects, features and advantages will become more readily apparent as the description of a preferred embodiment of the invention proceeds.

Referring now to the drawings:

Figure 1 is a view partly in side elevation and partly in section of a portion of an accounting machine embodying the invention, Figure 2 is a perspective view of a linkage and solenoid employed in carrying out the invention, Figure 3 is a view similar to a portion of Figure 1 and showing the parts in an intermediate stage of operation, Figure 4 is a perspective view, partially exploded, showing a portion of a register and the operating means therefor, Figure 5 is a perspective view of the "clear" symbol printing means, and Figure 6 is a diagrammatic view of a work sheet showing the type of work performed by the machine and indicating the functions of the machine in the various columns.

In the drawings only those parts of the machine have been shown which are more or less directly involved in carrying out the present invention. While the invention is useful and may readily be incorporated in a number of different accounting machines, the particular machine of which parts are shown in the drawing is more fully shown and described in the patent to Sharpe, No. 2,707,076, and reference will be made hereinafter to said patent for a description of certain functions and mechanisms of the complete machine.

The keyboard, which in the present instance is substantially a standard typewriter keyboard, is generally indicated in Figure 1 at 10. Each key is carried by a key lever 11 pivoted on a cross-rod 12 and normally held up by a relatively light spring 13. Each key lever has pivotally connected thereto a hook member 14 adapted to engage an actuator 15 when the key lever is operated to thereby move a toothed pawl 16 of said actuator into engagement with a continuously rotating fluted shaft 17. The actuator 15 is pivotally connected to a link 18 which in turn is pivotally mounted on a cross-rod 19 and the actuator is normally held in the position shown in the drawing by a spring 20. An edge of link 18 engages an arcuate portion of a sub-lever 21 pivoted on a cross-rod 22 and connected by a pull-link 23 to a type bar 24 pivoted on a case shiftable segment wire 25. Upon depression of a key of the keyboard 10, the toothed pawl 16 is moved into engagement with the fluted shaft, whereupon the actuator 15 swings the link 18 clockwise to thereby rock the sub-lever 21 and swing the type bar to engage the type thereof with the usual letter-feed cylindrical platen, not shown. All the type actions are generally similar to the one described above but the "clear" signal type action is not provided with a key because it is not desirable that it be manually operated.

The particular key lever to which the reference numeral 11 is applied is part of the "clear" signal type action and pivotally mounted therebelow at 26 is a two-armed lever 27, one arm of which is provided with a tab 28 fitting over the top of said key lever and a roller 29 fitting against the bottom thereof. The other arm of the lever 27 is engaged by a roller 30 provided on one end of a link 31 which link is pivotally connected at its other end to the armature 32 of a solenoid 33. Thus, upon actuation of the solenoid 33, as will presently be explained, the link 31 rocks the two-armed lever 27 in a clockwise direction to pull down on the key lever 11 and cause the printing of a "clear" signal.

As explained in the above referred to patent to Sharpe, there are three groups of interspersed registers located beneath the keyboard in a so-called computing section of the machine and the particular register or registers to be actuated, as well as the method of operation, that is, whether add or subtract, is determined automatically in accordance with a predetermined program as the carriage moves to its various columnar positions. For each group of interspersed registers there is a set of differential actuators and as an amount is printed on a work sheet when the carriage is in a computing zone, that amount is indexed in one or more of the sets of differential actuators. After the last digit of the amount is printed, the machine is automatically given a cycle of operation and the indexed amount is run into the selected register or registers either additively or subtractively, all as fully explained in the above mentioned patent to Sharpe. Inasmuch as the means for indexing the differential actuators is not a part of the present invention said means has not been shown but one of the actuators of one of the three sets of actuators is indicated in Figures 1 and 3 at 34.

Each differential actuator 34 is provided with a set of pins 35, ten in number, normally located as shown in Figure 1 with the "0" pin projecting below the actuator in the path of movement of a cyclically operable general operator 36. Upon the printing of a digit other than "0," the corresponding pin 35 is projected below the actuator and the "0" pin is raised. The forward end of each actuator is provided with a set of rack teeth 37 meshed with the teeth of an idler gear 38 rotatably mounted on a stationary shaft 39.

In general, the construction and operation of the registers or totalizers is the same as described in detail in the patent to Pitman, No. 2,436,055. Each register, or interspersed register group, comprises a pair of side plates 40, one of which is shown in Figures 1 and 3, tied together by shafts 41 and 42 and other cross pieces, not shown. The register wheels are individually rotatable upon the shaft 42 and, as best shown in Figure 4, each wheel is of a composite construction comprising a toothed wheel 43, a spiral stepped cam 44 and a notched disk 45, the disk 45 being one of the novel features of the present invention as will later more fully appear.

Corresponding to each denominational order register wheel is a detent arm 46, mounted upon the shaft 41 and spring urged to engage a rounded end thereof with the teeth of the corresponding wheel 43. When the register wheels are in any angular position other than "0," the teeth of the wheels 43 hold the detent arms in the position shown in Figures 1 and 3 but when any wheel is in "0" position the corresponding arm 46 is permitted to swing slightly counterclockwise, the teeth adjacent said arm when the wheel is in "0" position being provided with crescent shaped cut-outs 48.

Mounted upon the shaft 41 adjacent each detent arm 46 is a carryover trip arm 49 adapted to be swung clockwise by a pin protruding from the side of the toothed wheel 43 when the register wheel moves from "0" to "9" or from "9" to "0."

The register, with its detent arms 46 and carryover arms 49, is mounted in a movable frame comprising a pair of side plates 51, only one of which is shown, tied together by a pair of rods 52 and 53 and crossbars 54 and 55, see particularly Figure 3. Each of the side plates 51 is provided with an elongated open-ended slot 56 by means of which the register carrying frame is slidably and rockably mounted upon the idler wheel shaft 39. By means presently to be referred to, the register carrying frame is moved rearwardly to mesh the toothed register wheels 43 with the idler gears 38 when subtraction is to be performed and is rocked downward to mesh the register wheels directly with the rack teeth 37 of the differential actuators when addition is to be performed.

As explained in the above referred to patent to Sharpe, the machine partially illustrated in the present drawings is adapted to add and subtract and print totals in a number of vertical columns on a work sheet in accordance with a predetermined schedule. Carriage carried controls in cooperation with register selecting devices determine which ones of three state-control slides 57, shown in Figure 5, are permitted to move forward under the action of their respective springs 58 and the extent of that forward movement in each computing column.

Each state-control slide is provided with a cam slot 59 within which rides a cam follower, not shown, of a member 60, see Figure 4, slidably keyed to a rockshaft 61. When a state-control slide moves forward to its full extent, the associated member 60 moves to the left, as viewed in Figure 4, so that a tab 62 thereof underlies the lower edge of a bail 63 pivotally mounted upon the rockshaft 61. When a state-control slide moves forward half way, the member 60 is moved to the right so that a tab 64 thereof overlies a member 65 loosely mounted on the rockshaft 61 and articulated to the register carrying frame rod 53. With the state-control slide in normal position, the tab 62 is located in alignment with a notch 66 of the bail 63 and the tab 64 is located to the left of the member 65.

As explained in the patent to Sharpe, the rockshaft 61 is rocked clockwise at the beginning of each cycle and restored to normal position just as the second half of the cycle gets under way. With a state-control slide halfway forward, the associated member 60, through the cooperation of the tab 64 thereof with the member 65, rocks the register carrying frame downward to engage the register wheels with the teeth of the differential actuators 34 so that any amount indexed in said actuators will be run additively into the register during the first half cycle. When a state-control slide moves all the way forward, the associated member 60 rocks the bail 63 clockwise and through a connection 67, said bail moves the register carrying frame rearward to mesh the register wheels with the idler gears 38 so that the indexed amount will be run subtractively into the register during the first half cycle.

It is not believed necessary to explain the carryover or the fugitive one mechanisms in detail since these are well known to those familiar with the Underwood bookkeeping machine and are fully explained in a number of patents including the above referred to patents to Sharpe and Pitman. In general however, when a register wheel turns from "0" to "9" or from "9" to "0," the associated carryover trip arm 49 is rocked clockwise and the lower end thereof contacts an upwardly extending arm of a bell crank 68 pivotally mounted upon the rod 53, see Figures 1 and 3, and rocks said bell crank counterclockwise. An end 69 of a horizontal arm of the bell crank underlies an end of a spring-urged slide 70 and, when said bell crank is rocked, the end 69 thereof lifts the end of the slide 70 to free said slide from latching engagement with a bar 71, whereupon said slide moves to the left as viewed in the drawing and swings counterclockwise a lever 72 pivotally connected to the other end thereof. Swinging of the lever 72 places a roller 73 thereof in the path of movement of a lever 74 pivotally mounted upon the general operator bar 36. There is a lever 74 for each one of the differential actuators 34 and the particular one into whose path the roller 73 is projected is the one corresponding to the denominational order next highest to the register wheel which is moved from "0" to "9" or "9" to "0." With the roller 73 in the path of movement of the lower end of lever 74, said lever is swung counterclockwise as the general operator 34 reaches the forwardmost extent of its movement to thereby move the differential actuator associated therewith an additional step forward to turn the associated denominational order register wheel one more unit than called for by the pin 35 set in that denomination. There is no bell crank 68 for the highest order register wheel but there is pivoted on the rod 53 in position to be operated by the carryover trip lever 49 of the highest order wheel a member like the upstanding arm of the bell cranks and this member is connected by a bail 75 to a member 76 similar to the horizontal arms of the bell cranks and when the highest order wheel moves from "0" to "9" or "9" to "0," this mechanism adds or subtracts "one" in the lowest order register wheel.

The carryover and fugitive one mechanisms briefly outlined in the paragraph next above causes the register wheels to operate as follows: supposing a five order register is standing at 00000 and 100 is added to the register, the wheels will be turned to 00100. If now 101 is subtracted out, the wheels will turn to 99998, which is the 9's complement of minus one and is the correct answer. If "one" is added to the register standing at "minus one" represented by 99998 the wheels will stand at 99999 which is the 9's complement of zero. Thus it is apparent that with a register mechanism of the type described the wheels will stand at all "9's" when the register is "cleared" from the negative or credit side by adding in a positive amount equal to the negative amount in the register.

In order to facilitate the automatic printing of a "clear" sign, it is desirable that the register wheels be brought to all zeros, regardless of whether the register is cleared from the positive side or from the negative side. The manner in which this is accomplished by the present invention will now be explained.

As previously mentioned, each register wheel includes a disk 45. The periphery of each disk is concentric with the shaft 42 except that each is provided with an irregularity in the form of an arcuate notch 77. Mounted upon the shaft 41 adjacent the carryover levers 49 are a set of members 78, one for each disk 45, as best shown in Figure 4. A spring 79 attached to each member 78 holds a rounded lower end 80 of the member in contact with the periphery of its corresponding disk and when a register wheel is in the "9" position the end 80 engages within the notch 77.

Extending across the front of the register and mounted upon the framework of the machine is an insulating strip 81 upon which is mounted a composite series switch generally designated 82, see Figure 1. As indicated in Figures 1 and 4, the switch 82 comprises a series of lower contacts 83 and upper contacts 84. An electrically conductive spring metal strip 85 extends between each lower contact 83 and the upper contact 84 to the right thereof and said strip is biased to maintain the aligned lower and upper contacts out of engagement with each other. An insulator 86 is provided on the top of each strip 85. When all the contacts of the switch 82 are closed, in a manner presently to be explained, an electric circuit is established from a power source, not shown, through a solenoid 87, Figure 2, and a conductor 88 to a ground 89. The solenoid 87 is located adjacent the solenoid 33 previously referred to and is aligned therewith as indicated in Figure 1.

It has been previously mentioned that the register, including the shaft 41 upon which the members 78 are mounted, is rocked downward about the shaft 39 to mesh the toothed register wheels 43 with the teeth 37 of the differential actuators when addition is to be performed. The upper ends of the members 78 are provided with downwardly turned switch operating portions 90 and when a register wheel stands at "9" so that the rounded lower end 80 of the associated member 78 is seated in the notch 77 of the disk 45 and the register is in addition performing position, the downwardly turned portion 90 contacts the associated switch insulator 86 and closes a pair of the contacts 83 and 84, as indicated in Figure 3. When all the wheels stand at "9," which as explained above is the case when the register is "cleared" by addition, the circuit including the solenoid 87 is closed and said solenoid is energized. With a register wheel standing at any number other than "9," the associated member 78 is rocked clockwise by the disk 45 sufficiently so that its downwardly extending portion 90 will not contact its associated insulator 86 to close the contacts 83 and 84 and the circuit to the solenoid remains open. The members 78 are not effective during subtraction.

The armature 91 of the solenoid 87 is pivotally connected to one end of a link 92 the other end of which is pivotally connected to one arm of a bell crank 93 pivotally mounted upon a bracket 94 shown in Figure 2. The other arm of the bell crank 93 bears against the upper end of a post 95 which is secured at its lower end to a shoulder 96 provided upon one arm of a bent lever 97. The lever 97 is pivotally mounted at 98 on the framework of the machine and has an arm 99 which extends beneath the set of slides 70 and the free end of said arm lies just below the lower edge of a member 100 pivotally mounted at 101 on a bracket 102. The member 100 has a bent over ear 103 which rests beneath the slide 70 of the lowest denominational order. Upon actuation of the solenoid 87, as above explained, the lever 97 is rocked counterclockwise and its arm 99 rocks the member 100 counterclockwise so that the bent over ear 103 thereof lifts the slide 70 from latching engagement with the bar 71. With the slide 70 of the lowest denominational order disengaged from the bar 71 and moved to the left as aforesaid, a "1" will be added into the lowest order register wheel during the adding cycle. Thus, when an amount is added which is equal to the negative amount already in the register, the usual known mechanism causes the wheels to turn to all "9's" and the mechanism above described of the present invention causes an additional "1" to be added into the register, whereupon the wheels of course all turn to "0." The movement of the highest order wheel from "9" to "0" in this instance has no effect upon the lowest order wheel because the lowest order carryover slide 70 has already been actuated by the solenoid 87. A spring 104 extending between the shoulder 96 and a fixed anchor is effective to restore to normal position the solenoid armature and the linkage operated thereby.

The particular mechanism for automatically printing a clear sign after the register wheels have been turned to all "0's" is not of the essence of this invention and therefore need not be explained in detail. One means for accomplishing this is explained in the patent to Pitman, No. 2,655,311 and in general comprises a pivotally mounted bail member 105, see particularly Figure 5, which is swung inwardly by a spring 106 when all the wheels stand at "0" and the cutouts 48 present themselves to the detent arms 46 so that said arms move inward as previously mentioned. A slidably mounted feeler member 107 cooperates with the bail member 105 and is free to move downward only when said bail member is in its inward position. At its lower end the feeler member is articulated by a pin-and-slot connection 108 to one arm of a pivotally mounted bell crank 109 the other arm of which is articulated to the forward end of a slide 110 urged rearwardly by a spring 111. There are various locks which need not be explained which determine the timing of the operation of the slide 110 so that during the second half of the computing cycle said slide is free to move rearward if the register wheels are all at "0" to thereby allow the feeler member 107 to move downward. When any one of the three slides 110 (there is a slide for each of the three registers) moves rearward, it rocks rearwardly an arm 112 which fits into a notch 113 of said slide. Rocking of an arm 112 rocks counterclockwise a shaft 114 to which said arms are fastened.

Also secured to the shaft 114 is an arm 115 which is pivotally connected to the lower end of a vertically slidable member 116 and the rocking of said shaft raises said member and causes said member to close a switch 117 which is in a circuit including the hereinbefore mentioned solenoid 33. Upon the closing of the switch 117, the solenoid 33 is energized and causes the printing of the "clear" symbol as previously explained.

While it has been mentioned that the illustrated machine has a plurality of registers, and the present invention is particularly adaptable for use in a multiple register machine, nevertheless it is contemplated that for most effective use the invention will be applied to only one of the registers. One type of work that such a machine is admirably adapted to perform is illustrated by the work sheet shown in Figure 6.

In Figure 6, the notations, "A," "B," "B$_1$" and "C" designate four registers in which the machine will operate while performing an Accounts Receivable operation. Register "C" is the one to which the above described mechanism of the present invention is applied and it is used for a line "proof." The figures entered in the first two columns of the sheet do not, of course, go into a register.

When the amount is entered in the Old Balance column it is run additively into the "A" register, which in the present instance is used as a crossfooter. That is, the "A" register is the one which is used to give the New Balance total for each horizontal line of entries.

The 10 00 entered in the Debits column is added into the "A" register so that at that time the "A" register contains the amount 35 00, the amount 25 00 having previously been entered in this register in the Old Balance column. This amount in the Debits column is also entered additively into the "B" register from which the total of all entries in this column may subsequently be printed and is likewise added into the "C" or "proof" register.

In the Credits column the machine operates subtractively and the amount in the "A" register is therefore reduced to 20 00. In the "C" register, the amount 15 00 is subtracted from the amount 10 00 previously entered and the wheels of this register, assuming a five wheel register, turn to 99499, the fugitive one mechanism being effective because the highest order wheel turns from "0" to "9." The "B$_1$" register is used to accumulate the entries in this column.

When the machine reaches the New Balance column, the amount is automatically printed from the "A" register as explained in the above referred to patent to Sharpe and during the automatically initiated cycle following the printing of the amount said amount is entered subtractively in the "A" register, clearing said register, and in the "C" register. The "C" register now contains minus 25 00 and the wheels stand at 97499.

In the Proof column, the operator copies the amount 25 00 from the same place it was copied when entering the Old Balance and this amount is run additively into the "C" register. But for the mechanism of this invention, the wheels of the "C" register would turn to 99999. With the present invention, when the wheels reach the all "9's" condition an additional "1" is added, as above explained, and the wheels then turn to 00000 and a distinctive symbol such as a star is printed, indicating that the entries on this line have been made correctly.

Having thus described a preferred embodiment of the invention, what is claimed is:

1. In a machine of the class described, a credit balance totalizer adapted to register negative amounts as the "9's" complement of the true negative amount, said totalizer comprising a plurality of axially aligned wheels, a sensing means for each wheel of said register for detecting when the associated wheel stands at "9," means to add "1" into said register, said means being retained ineffective by any of said sensing means whose associated wheel does not stand at "9."

2. In a machine of the class described, a credit balance totalizer shiftable into addition and subtraction positions and adapted to register negative amounts as the "9's" complement of the true negative amount, said totalizer comprising a plurality of axially aligned wheels, a sensing means for each wheel for detecting when each of said wheels stands at "9," means made effective by all of said sensing means when all of said wheels has arrived at "9" while said register is in an adding position to add "1" into said register and thereby bring all of said wheels to "0," and means for sensing said all "0" condition and printing a distinctive symbol.

3. In a machine of the class described, a credit balance totalizer adapted to register negative amounts as the "9's" complement of the true negative amount, said totalizer comprising a plurality of denominational order representing wheels and being movable from an inactive position to an adding position and to a subtracting position, means for entering amounts into said totalizer, carryover mechanism for said totalizer including a carryover device for the lowest order wheel, said carryover device being operated by the highest order wheel so as to add "1" into the lowest order wheel when the highest order wheel moves from "9" to "0" during an adding operation and to subtract "1" from the lowest order wheel when the highest order wheel moves from "0" to "9" during a subtracting operation, means for sensing an all "9" condition of said wheels, and means effective when an all "9" condition is sensed and said totalizer is in adding position to operate said carryover device whereby said lowest order wheel is turned from "9" to "0" and the rest of the carryover mechanism causes the other wheels to turn from "9" to "0."

4. In a machine of the class described, a credit balance totalizer adapted to register negative amounts as the "9's" complement of the true negative amount, said totalizer comprising a plurality of denominational order representing wheels, said wheels being of composite construction and each including an element having a generally circular periphery with an irregularity at the "9" position, said register being movable from an inactive position to an adding position and to a subtracting position, means for running indexed amounts into said totalizer, carryover mechanism for each wheel, the carryover mechanism for the wheel of lowest denominational order being normally actuated by the highest denominational order wheel, and means for sensing the irregularities of the peripheries of said elements, said last named means being effective when said totalizer is in the adding position and all the totalizer wheels stand at "9" to actuate the carryover mechanism of the lowest denominational order wheel whereby said wheel will turn to "0" and the carryover mechanisms of the other wheels will be actuated to bring all said wheels to "0."

5. In a machine of the class described, a credit balance totalizer adapted to register negative amounts as the "9's" complement of the true negative amount, said totalizer comprising a plurality of denominational order representing wheels, said wheels being of composite construction and each including an element having a generally circular periphery with an irregularity at the "9" position, said register being movable from an inactive position to an adding position and to a subtracting position, means for running indexed amounts into said totalizer, carryover mechanism for each wheel, the carryover mechanism for the wheel of lowest denominational order being normally actuated by the highest denominational order wheel, a solenoid and a linkage operated thereby for actuating the carryover mechanism for said lowest order wheel, a composite series switch in a circuit with said solenoid, said solenoid being energized only when said switch is closed, and means for sensing the irregularities of the peripheries of said elements, said last named means being effective when said totalizer is in the adding position to close said switch when all the totalizer wheels stand at "9" to thereby energize said solenoid and actuate the carryover mechanism of the lowest denominational order wheel whereby said wheel will turn to "0" and the carryover mechanisms of the other wheels will be actuated to bring all said wheels to "0."

References Cited in the file of this patent

UNITED STATES PATENTS

| | | |
|---|---|---|
| 2,195,606 | Toggenburger | Apr. 2, 1940 |
| 2,428,084 | Lambert | Sept. 30, 1947 |
| 2,655,311 | Pitman | Oct. 13, 1953 |
| 2,665,063 | Frieberg et al. | Jan. 5, 1954 |
| 2,775,403 | Hall et al. | Dec. 25, 1956 |